(12) United States Patent
Tatum (10) Patent No.: US 10,298,330 B2
(45) Date of Patent: May 21, 2019

(54) HOST-EQUALIZED OPTICAL INKS (71) Applicant: FINISAR CORPORATION, Sunnyvale, CA (US)

(72) Inventor: Jim Alan Tatum, Plano, TX (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/085,752

(22) Filed: Mar. 30, 2016

(65) Prior Publication Data
US 2017/0288779 A1 Oct. 5, 2017

(51) Int. Cl.
H04B 10/00 (2013.01)
H04B 10/12 (2006.01)
H04B 10/40 (2013.01)
H04J 14/02 (2006.01)
H04B 10/50 (2013.01)
H04B 10/69 (2013.01)

(52) U.S. Cl.
CPC ........... *H04B 10/40* (2013.01); *H04B 10/503* (2013.01); *H04B 10/69* (2013.01); *H04J 14/02* (2013.01)

(58) Field of Classification Search
USPC .................. 398/116, 135, 141, 139, 189, 183
See application file for complete search history.

(56) References Cited

U.S. PATENT DOCUMENTS 6,563,614 B1 * 5/2003 Stephens ............ H04B 10/0775
398/136
6,609,842 B1 * 8/2003 Kimbrough ........... H01S 5/0683
398/194
6,665,498 B1 * 12/2003 Jiang ...................... H04B 10/25
398/135
6,684,033 B1 * 1/2004 Doh .................... H04B 10/6931
375/225
6,738,584 B1 * 5/2004 Tsuda ..................... H04B 10/11
385/123
6,744,964 B1 * 6/2004 Vittal ................ H04B 10/25073
385/140
7,317,769 B2 * 1/2008 Tonietto ........... G11B 20/10009
342/151

(Continued)

OTHER PUBLICATIONS

Lisa Huff, Optical Components: The VCSEL Advantage, Jun. 22, 2011, All Pages.*

*Primary Examiner* — David C Payne
*Assistant Examiner* — Pranesh K Barua
(74) *Attorney, Agent, or Firm* — Maschoff Brennan (57) ABSTRACT An embodiment includes a host-equalized optical transceiver. The host-equalized optical transceiver includes a driver analog interface, a linear laser diode driver (LLDD), and an optical transmitter. The driver analog interface is configured to interface with a host integrated circuit (IC) of a host system. The LLDD is directly electrically coupled to a host IC of the host system via the driver analog interface. The LLDD is configured to receive an equalized electrical data signal directly from the host IC via the driver analog interface and to generate a driving signal based on the equalized electrical data signal. The equalized electrical data signal is a linear signal. The optical transmitter is electrically coupled to the LLDD. The optical transmitter is configured to receive the driving signal from the LLDD and to generate an optical signal that is representative of the driving signal.

14 Claims, 4 Drawing Sheets

(56) References Cited

U.S. PATENT DOCUMENTS

| | | | |
|---|---|---|---|
| 9,231,704 B1* | 1/2016 | Zhou | H04B 10/58 |
| 2002/0167707 A1* | 11/2002 | Oomori | H04B 10/079 |
| | | | 398/202 |
| 2003/0180055 A1* | 9/2003 | Azadet | H04B 10/503 |
| | | | 398/183 |
| 2004/0223768 A1* | 11/2004 | Shastri | G02F 1/0121 |
| | | | 398/183 |
| 2005/0191059 A1* | 9/2005 | Swenson | H04B 10/2581 |
| | | | 398/159 |
| 2006/0008279 A1* | 1/2006 | Chiang | H04B 10/6971 |
| | | | 398/202 |
| 2006/0093368 A1* | 5/2006 | Giaretta | H04B 10/43 |
| | | | 398/135 |
| 2006/0245765 A1* | 11/2006 | Elahmadi | H04B 10/2513 |
| | | | 398/189 |
| 2007/0036084 A1* | 2/2007 | Lindsay | H04B 10/66 |
| | | | 370/246 |
| 2007/0104490 A1* | 5/2007 | Ghiasi | H04B 10/25137 |
| | | | 398/159 |
| 2007/0297733 A1* | 12/2007 | Mader | H04B 10/40 |
| | | | 385/123 |
| 2008/0089700 A1* | 4/2008 | Takahashi | H04B 10/0779 |
| | | | 398/208 |
| 2008/0159756 A1* | 7/2008 | Cheng | H03F 1/0277 |
| | | | 398/210 |
| 2008/0267633 A1* | 10/2008 | Weem | H04B 10/40 |
| | | | 398/116 |
| 2008/0298815 A1* | 12/2008 | Khalouf | H04H 20/69 |
| | | | 398/202 |
| 2009/0103927 A1* | 4/2009 | Cunningham | H04B 10/6971 |
| | | | 398/139 |
| 2009/0269058 A1* | 10/2009 | Summa | H04B 10/0795 |
| | | | 398/37 |
| 2010/0028015 A1* | 2/2010 | Hosking | H04B 10/40 |
| | | | 398/135 |
| 2010/0054733 A1* | 3/2010 | Hosking | H04B 10/0779 |
| | | | 398/25 |
| 2010/0329325 A1* | 12/2010 | Mobin | H04L 25/03057 |
| | | | 375/232 |
| 2011/0013905 A1* | 1/2011 | Wang | G01M 11/33 |
| | | | 398/21 |
| 2011/0299858 A1* | 12/2011 | Mazzini | H04B 10/516 |
| | | | 398/183 |
| 2012/0020672 A1* | 1/2012 | Aguren | G01M 11/3154 |
| | | | 398/139 |
| 2012/0141134 A1* | 6/2012 | Hauske | H04B 10/25137 |
| | | | 398/135 |
| 2012/0148260 A1* | 6/2012 | Akiyama | H04B 10/505 |
| | | | 398/184 |
| 2012/0177368 A1* | 7/2012 | Aoki | H04B 10/616 |
| | | | 398/38 |
| 2012/0189300 A1* | 7/2012 | Lindsay | H04B 10/0731 |
| | | | 398/26 |
| 2013/0188965 A1* | 7/2013 | Afriat | H04B 10/60 |
| | | | 398/136 |
| 2013/0302037 A1* | 11/2013 | Wernlund | H04B 10/2503 |
| | | | 398/141 |
| 2014/0169789 A1* | 6/2014 | Bhoja | H04B 10/541 |
| | | | 398/45 |
| 2014/0186029 A1* | 7/2014 | Khoury | H04B 10/073 |
| | | | 398/27 |
| 2015/0010312 A1* | 1/2015 | Berkram | H04L 7/0008 |
| | | | 398/136 |
| 2016/0065326 A1* | 3/2016 | Kisaka | H04L 27/2096 |
| | | | 398/65 |

* cited by examiner

HOST-EQUALIZED OPTICAL INKS

FIELD

The embodiments discussed herein are related to communication modules and optical communication systems. In particular, some embodiments relate to host-equalized optical links.

BACKGROUND

Communication links may be used to communicate data and information between host systems. In some applications, copper or non-optical communication links may be implemented between the host systems. The copper or non-optical links may suffer from data rate limitations among other inefficiencies. In other applications, optical communication links may be implemented between the host systems. The optical communication links may increase data rates relative to the copper or non-optical links and provide other advantages. The optical communication links, however, may be more complex and may consume more power than the copper or non-optical communication links.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment may include a host-equalized optical transceiver. The host-equalized optical transceiver may include a driver analog interface, a linear laser diode driver (LLDD), and an optical transmitter. The driver analog interface may be configured to interface with a host integrated circuit (IC) of a host system. The LLDD may be directly electrically coupled to a host IC of the host system via the driver analog interface. The LLDD may be configured to receive an equalized electrical data signal directly from the host IC via the driver analog interface and to generate a driving signal based on the equalized electrical data signal. The equalized electrical data signal may be a linear signal. The optical transmitter may be electrically coupled to the LLDD. The optical transmitter may be configured to receive the driving signal from the LLDD and to generate an optical signal that is representative of the driving signal.

Another embodiment may include a host-equalized optical link configured to be implemented between a first host system and a second host system. The host-equalized optical link may include a first host-equalized optical transceiver, an optical fiber, and a second host-equalized optical transceiver. The first host-equalized optical transceiver may include a driver analog interface, an LLDD, and an optical transmitter. The driver analog interface is configured to interface with a first host IC of the first host system. The LLDD may be directly electrically coupled to the first host IC via the driver analog interface. The LLDD may be configured to receive an equalized electrical data signal directly from the first host IC via the driver analog interface and to generate a driving signal based on the equalized electrical data signal. The equalized electrical data signal may be a linear signal. The optical transmitter may be electrically coupled to the LLDD. The optical transmitter may be configured to receive the driving signal from the LLDD and to generate an optical data signal that is representative of the driving signal. The second host-equalized optical transceiver may include an amplifier analog interface, an optical receiver, and a linear transimpedence amplifier (LTIA). The optical receiver may be communicatively coupled to the optical transmitter of the first host-equalized optical transceiver via the optical fiber. The optical receiver may be configured to receive optical data signals communicated along the optical fiber and to convert the received optical data signals to electrical data signals that are representative of the received optical signals. The electrical data signals may include one or more degraded characteristics. The LTIA may be electrically coupled to the optical receiver and directly electrically coupled to a second host IC of the second host system via the amplifier analog interface. The LTIA may be configured to receive the electrical data signals from the optical receiver and communicate amplified electrical signals directly to the host IC via the amplifier analog interface. The amplified electrical signals may include the degraded characteristics.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Communication links may be implemented between host systems. The communication links may communicate data and information between the host systems. The host systems may include host integrated circuits that are configured to interface with the communication modules of the communication links. The host ICs may perform some equalization and correction of electrical data signals communicated between the host systems and the communication modules of the communication links.

In some applications, the communication links may implement optical communication modules such as optical transceiver modules. For example, a first optical transceiver module may be implemented in a first of the host systems and a second optical transceiver module may be implemented in a second of the host systems. In the communication links, including the optical communication modules, equalization and correction may be performed by the communication link. For instance, the optical communication modules may include a transmitter equalization circuit and/or a receiver equalization circuit such as a clock and data recovery (CDR) circuit. The transmitter equalization circuit and/or the receiver equalization circuit may perform equalization and correction operations that may compensate or reduce degraded characteristics of optical data signals communicated between the host systems.

The equalization and correction operations performed by the communication link consume power. In addition, the transmitter equalization circuit and/or the receiver equalization circuit that perform the equalization and correction operations increase the complexity of the optical communication modules. Accordingly, some embodiments described in this disclosure include host-equalized communication links. In the host-equalized communication links, optical communication modules may omit the transmitter equalization circuit and/or the receiver equalization circuit. Instead of the transmitter equalization circuit and/or the receiver equalization circuit performing the equalization and correction operations, the host-equalized communication links rely on the host ICs to perform the equalization and correction operations. Some embodiments of the host-equalized communication links may include analog interfaces between the optical communication modules and the host ICs. Additionally, linear components such as linear transimpedance amplifiers (LTIAs) and linear laser diode drivers (LLDDs) may be implemented that are directly electrically coupled to the host ICs.

Some additional details of these and other embodiments are described with reference to the appended figures. In the appended figures, structures and features with the same item numbers are substantially the same unless indicated otherwise.

Figure 1:
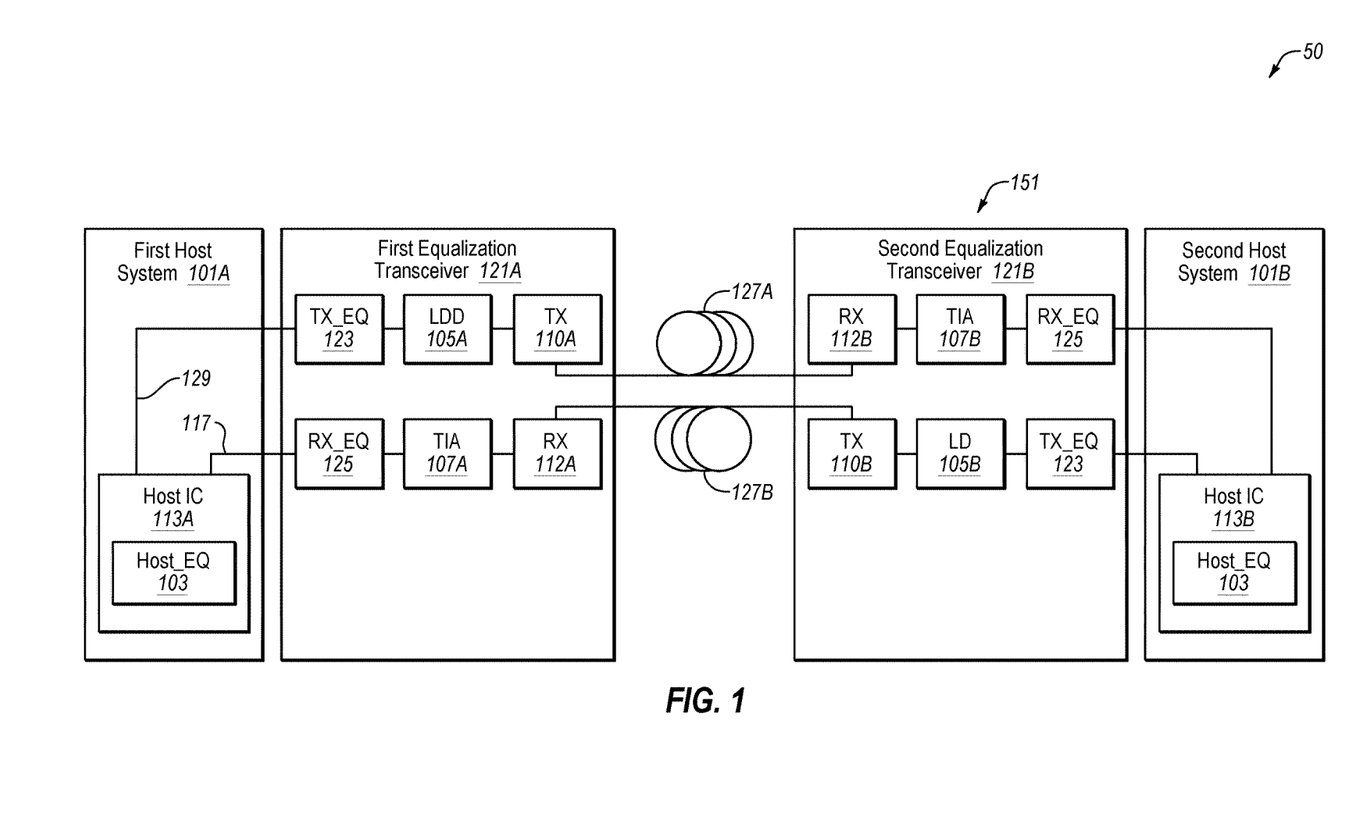
FIG. 1 is a block diagram of an example link-equalized optical communication system.

FIG. 1 illustrates a block diagram of a link-equalized optical system 50. The link-equalized optical system 50 may represent a conventional optical system. The link-equalized optical system 50 may include a first host system 101A that is optically connected to a second host system 101B via a link-equalized optical link 151. For example, the first host system 101A may communicate data and information to the second host system 101B via the link-equalized optical link 151. In addition, the first host system 101A may receive data and information from the second host system 101B via the link-equalized optical link 151.

The link-equalized optical link 151 may include a first equalization transceiver 121A that is optically coupled to a second equalization transceiver 121B via one or more optical fibers 127A and 127B (generally, optical fiber 127 or optical fibers 127). The first equalization transceiver 121A and the second equalization transceiver 121B may be collectively referred to as equalization transceivers 121. The optical fibers 127 may include a flexible glass or plastic fiber on which optical data signals may be communicated from the first equalization transceiver 121A to the second equalization transceiver 121B. In some embodiments, the optical fibers 127 may include single mode fiber (SMF). In some embodiments, the optical fibers 127 may include multimode fiber (MMF).

The equalization transceivers 121 may include optical transmitters 110A or 110B (generally, TX 110 or TXs 110), a laser driver diode 105A and 105B (generally, LDD 105 or LDDs 105) and transmitter equalization circuit 123 (in FIG. 1, "TX_EQ"). The TXs 110 may include any device capable of converting an electrical signal to an optical signal. The optical data signal generated by the TXs 110 is representative of the electrical signal. Some examples of the TXs 110 may include a semiconductor laser, a Fabry-Perot (FP) laser, a vertical cavity surface-emitting laser (VCSEL), and the like. The LDDs 105 provide an electrical data signal in the form of an electrical current to the TXs 110.

The equalization transceivers 121 may include optical receivers 112A and 112B (generally, RX 112 or RXs 112), a transimpedance amplifier 107A and 107B (generally, TIA 107 or TIAs 107), and receiver equalization circuit 125 (in FIG. 1, "RX_EQ"). An example of the RX 112 may include a photodiode.

The first host system 101A and the second host system 101B may include a host integrated circuit (IC) 113A and 113B (generally, host IC 113 or host ICs 113). The host ICs 113 may include host equalization circuit 103 (in FIG. 1, Host_EQ).

In the link-equalized optical system 50, an optical data signal may be received at the RX 112A. The received optical data signal may include some degraded characteristics. For example, the received optical data signal may include signal loss, attenuation, dispersion, some other signal degradation, or some combination thereof.

The RX 112 may generate an electrical data signal that is representative of the received optical data signal. Generated electrical data signals may include some or all of the degraded characteristics of the received optical data signal. The electrical data signal may be communicated to the TIA 107A. The TIA 107A may amplify the electrical data signal and may communicate an amplified electrical data signal to the receiver equalization circuit 125.

The receiver equalization circuit 125 may be configured to equalize the amplified electrical data signal. Equalization, as used in this disclosure, includes any electrical signal distortion or optical signal distortion that counteracts effect of limited bandwidth along a communication link. Equalization operations may include a CDR, a decision feedback equalization (DFE), decision directed (DD) equalization, least mean squared (LMS) equalization, and the like.

Accordingly, the receiver equalization circuit 125 may include a CDR circuit, a DFE circuit, a DD circuit, an LMS equalization circuit, some combination thereof, or similar equalization circuits. Equalization performed by the receiver equalization circuit 125 may reduce the degraded characteristics in the amplified electrical data signal and generate an equalized electrical data signal. The equalized electrical data signal may be communicated to the host IC 113 along a receiver link portion 117. The equalized electrical data signal may be a digital signal.

The receiver link portion 117 may be up to about twelve inches in length from the receiver equalization circuit 125 and the host IC 113A. The receiver link portion 117 may include copper traces and other copper components. As used in this disclosure, the term "copper" includes components comprised of non-optical materials and/or electrically conductive materials such as copper.

Some or all of the equalization performed by the receiver equalization circuit 125 may be based on a link equalization signal from the second equalization transceiver 121B. The link equalization signal may include equalization/link status information. For example, tap coefficient information used in the receiver equalization circuit 125 may be communicated from the second equalization transceiver 121B. The link equalization signal may be encoded on the optical data signal communicated between the equalization transceivers 121 and/or may be communicated via a supervisory channel between the equalization transceivers 121.

The host equalization circuit 103 may be configured to receive the equalized electrical data signal. The equalized electrical data signal received at the host equalization circuit 103 may be degrade as it travels from the receiver equalization circuit 125 to the host IC 113A on the receiver link portion 117. The host equalization circuit 103 may reduce degradation imposed on the equalized electrical data signal by the receiver link portion 117.

In addition, the first equalization transceiver 121A may communicate optical data signals to the second equalization transceiver 121B via the optical fibers 127. The optical data signals may be representative of an electrical data signal communicated from the first host system 101A to the transmitter equalization circuit 123 via a transmitter link portion 129. The electrical data signal may be a digital signal. The host equalization circuit 103 of the host IC 113A may be configured to equalize the electrical data signal prior to communication to the transmitter equalization circuit 123.

As the electrical data signal is communicated from the host IC 113A to the transmitter equalization circuit 123, the electrical data signal may degrade. The transmitter link portion 129 may be up to about twelve inches in length and may include copper components. The transmitter equalization circuit 123 may receive the electrical data signal that may be degraded. The transmitter equalization circuit 123 may be configured to equalize the electrical data signal and reduce degradation in the received electrical data signal.

Some or all of the equalization performed by the transmitter equalization circuit 123 may be based on a link equalization signal communicated from the second equalization transceiver 121B. The link equalization signal may include equalization/link status information, which may be encoded on the optical data signal communicated between the equalization transceivers 121 and/or may be communicated via the supervisory channel between the equalization transceivers 121.

The transmitter equalization circuit 123 may communicate an equalized electrical data signal to the LDD 105A. The LDD 105A may generate a laser driving signal based on the equalized electrical data signal. The laser driving signal may be communicated to the TX 110. The TX 110A may generate the optical data signal based on the laser driving signal. The optical data signal may be communicated along the optical fiber 127 to the second equalization transceiver 121B. The optical data signal may be processed at the second equalization transceiver 121B in a similar fashion as to that described above with respect to the first equalization transceiver 121A.

In the link-equalized optical system 50 the transmitter equalization circuits 123 and/or the receiver equalization circuits 125 are configured to equalize data signals to compensate for the optical portions (e.g., the optical fibers 127, the RX 112, the TX 110, or some combination thereof) of the link-equalized optical link 151. In addition, in the link-equalized optical system 50, the host equalization circuits 103 may equalize for the transmitter link portion 129 and the receiver link portion 117 and corresponding portions of the link in the second equalization transceiver 121B. The equalization performed by the transmitter equalization circuits 123 and/or the receiver equalization circuits 125 consumes power. Moreover, inclusion of the transmitter equalization circuits 123 and the receiver equalization circuits 125 increases complexity of the equalization transceivers 121.

Figure 2:
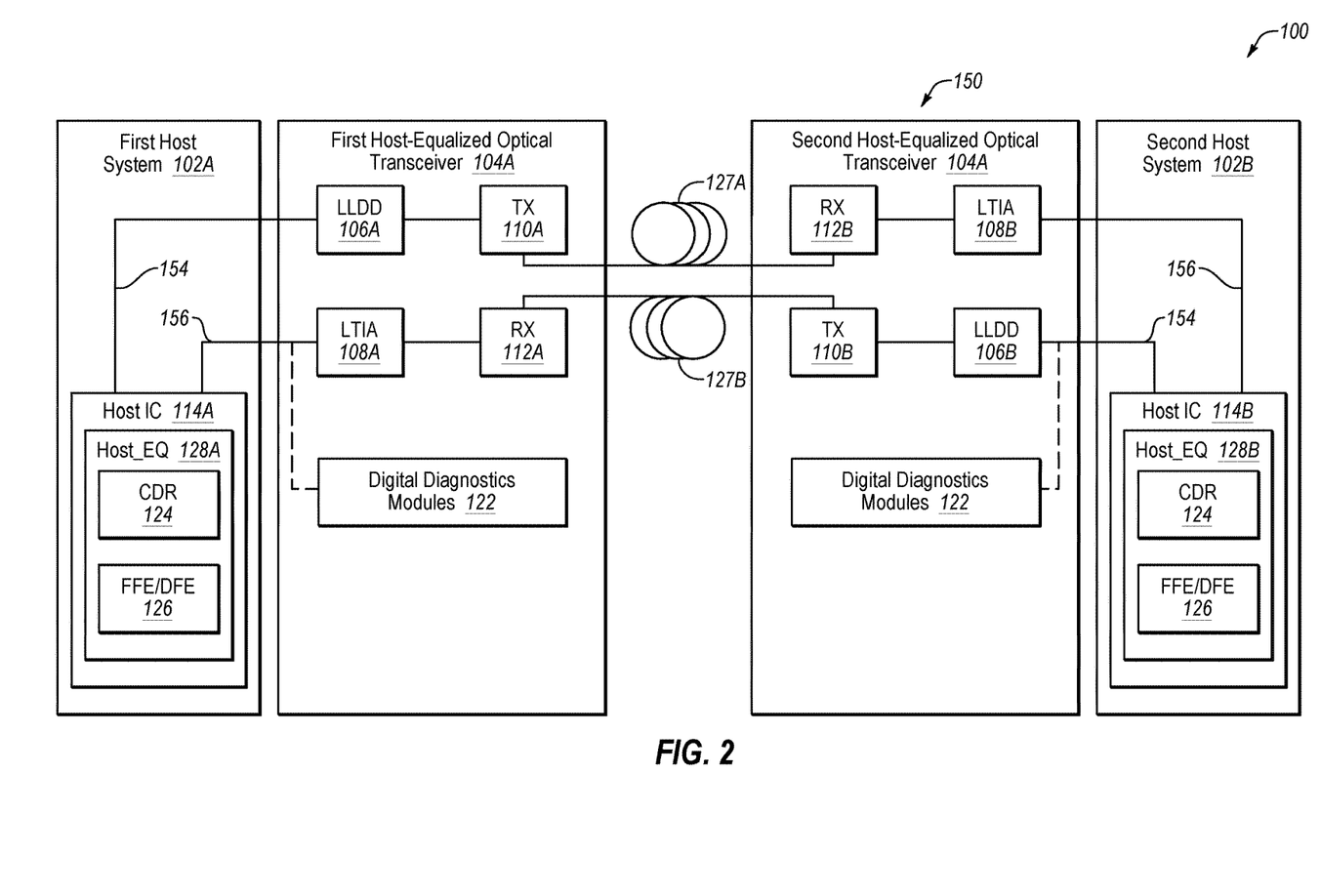
FIG. 2 is a block diagram of an example host-equalized optical communication system.

FIG. 2 represents a host-equalized optical system 100. The host-equalized optical system 100 may include a first host system 102A that is optically connected to a second host system 102B via a host-equalized optical link 150. For example, the first host system 102A may communicate data and information to the second host system 102B via the host-equalized optical link 150. In addition, the first host system 102A may receive data and information from the second host system 102B via the host-equalized optical link 150. The data communicated in the host-equalized optical system 100 may include linear signals end-to-end. In addition, in the host-equalized optical system 100, equalization is performed by the first host system 102A and the second host system 102B instead of by one or more components of the host-equalized optical link 150.

In some embodiments, the host-equalized optical link 150 may include a first host-equalized optical transceiver 104A that is optically coupled to a second host-equalized optical transceiver 104B via one or more optical fibers 127. The first host-equalized optical transceiver 104A and the second host-equalized optical transceiver 104B may be collectively referred to as "host-equalized transceiver 104" or "host-equalized transceivers 104." The host-equalized transceivers 104 may be physically and releasably coupled to the optical fibers 127. Optical data signals may be communicated between the first host-equalized transceiver 104A and the second host-equalized transceiver 104B via the optical fibers 127.

In some embodiments, one or both of the host-equalized transceivers 104 may be permanently attached to one or both of the host systems 102A and 102B or may be electrically pluggable to one or both of the host systems 102A and 102B. For example, the host-equalized transceivers 104 may include a solder-down transceiver (e.g., a mid board optical (MB) transceiver).

In some embodiments, the host-equalized optical link 150 may include an active optical cable (AOC). The AOC may include the host-equalized transceivers 104 that are permanently or semi-permanently attached to the optical fibers 127. The host-equalized transceivers 104 implemented in the AOC may be functionally similar to the host-equalized transceivers 104 implemented in the host-equalized optical link 150 with the optical fibers 127.

One or both of the host-equalized transceiver 104 may include the TXs 110 described with reference to FIG. 1. In particular, some embodiments of the host-equalized transceivers 104 may implement a VCSEL as the TX 110. The TX 110 may be optically coupled to one of the optical fibers 127. Accordingly, optical data signals generated by the TX 110 are communicated along the optical fibers 127 to one of the RX 112.

The host-equalized transceivers 104 may also include a linear laser driver diode 106A and 106B (generally, LLDD 106 or LLDDs 106). The LLDDs 106 may include a low power linear laser driver diode that is electrically coupled to one of the TXs 110 and directly electrically coupled to host ICs 114A and 114B (generally, host IC 114 or host ICs 114) implemented in the first host system 102A and/or the second host system 102B. The host ICs 114 may be built using complementary metal-oxide semiconductor (CMOS) technology.

In the embodiment of FIG. 2, the LLDDs 106 may be directly electrically coupled to the host ICs 114 via driver analog interfaces 154. The driver analog interfaces 154 may be copper interfaces. The host-equalized transceivers 104 do not include transmitter equalization circuits 123 described with reference to FIG. 1. For example, with reference to FIG. 1, the transmitter equalization circuits 123 are positioned between the LDD 105 and the host ICs 113. In contrast, in the embodiment of FIG. 2, the host-equalized transceivers 104 do not include the transmitter equalization circuits 123 and instead are directly electrically coupled to the host ICs 114 via the driver analog interfaces 154.

The transmitter equalization circuits 123 may be omitted because equalization functions that are performed by the transmitter equalization circuits 123 in the link-equalized optical system 50 of FIG. 1 may be performed by host ICs 114 in the host-equalized optical link 150. The host ICs 113 of the link-equalized optical system 50 only equalized the copper portions of the transmitter link portion 129. In contrast, the host ICs 114 in the host-equalized optical link 150 equalize the entire link e.g., from the first host system 102A to the second host system 102B.

The host-equalized transceivers 104 may include the RX 112 described with reference to FIG. 1. The RX 112 may be optically coupled to one of the optical fibers 127. Accordingly, optical data signals may be received from the optical fibers 127 from one of the optical transmitters 110A and 110B.

The host-equalized transceivers 104 may also include linear TIAs 108A and 108B (generally, LTIA 108 or LTIAs 108). The LTIAs 108 may be directly electrically coupled to the host ICs 114 via amplifier analog interfaces 156. The amplifier analog interfaces 156 may be copper interfaces. The host-equalized transceivers 104 do not include receiver equalization circuits 125 described with reference to FIG. 1. For example, with reference to FIG. 1, the receiver equalization circuits 125 are positioned between the TIAs 108 and the host ICs 113. In contrast, in the embodiment of FIG. 2, the host-equalized transceivers 104 do not include the receiver equalization circuits 125 and instead the LTIAs 108 are directly electrically coupled to the host ICs 114 via the amplifier analog interfaces 156.

The receiver equalization circuits 125 may be omitted because equalization functions that are performed by the receiver equalization circuits 125 in the link-equalized optical system 50 of FIG. 1 may be performed by host ICs 114 in the host-equalized optical link 150. As stated above, the host ICs 113 of the link-equalized optical system 50 only equalized the copper portions of the receiver link portion 117. In contrast, the host ICs 114 in the host-equalized optical link 150 equalize the entire link e.g., from the first host system 102A to the second host system 102B.

The host ICs 114 of FIG. 2 include host equalization circuits 128A and 128B (generally, host equalization circuit 128 or circuits 128) (in FIG. 2 "Host_EQ"). The host equalization circuits 128 may be configured to equalize data signals communicated to the LLDDs 106 and/or received from the LTIAs 108. Specifically, in the embodiment of FIG. 2, the host equalization circuits 128 may perform equalization along the entire host-equalized optical link 150. In addition, the host ICs 114 of FIG. 2 may work in conjunction across the host-equalized optical link 150 to equalize the entire host-equalized optical link 150.

For example, the first host system 102A may communicate an electrical data signal to the LLDD 106A via the driver analog interface 154. Prior to communication of the electrical data signal to the LLDD 106A, the host equalization circuit 128 may be configured to equalize the electrical data signal.

In addition, optical data signals received at the RX 112 may be degraded. The RX 112 may generate electrical data signals that are representative of the optical data signals. The electrical data signals generated by the RX 112 may include degraded characteristics of the received optical signals. The RX 112 may communicate the electrical data signals that include the degraded characteristics to the LTIA 108. The LTIA 108 may amplify the electrical data signals. Amplified electrical data signals output by the LTIA 108 may include the degraded characteristics or some representation thereof. The amplified electrical data signals may be communicated to the host IC 114 via the amplifier analog interfaces 156. The host IC 114 then performs one or more equalization operations to reduce the degraded characteristics of the amplified electrical data signals.

Some or all of the equalization performed by the host IC 114 may be based on a link equalization signal communicated between the first host system 102A and the second host system 102B. The link equalization signal may be representative of information used in correction and equalization of the optical signal generated by the optical transmitter and the optical signal received by the optical receiver.

The link equalization signal may include equalization/link status information. For example, the equalization/link status information may include tap coefficient information used in the host equalization circuit 128 of the host IC 114, which may be communicated between the first host system 102A and the second host system 102B. The equalization/link status information of the link equalization signal may be encoded on the optical data signal communicated between the first host system 102A and the second host system 102B and/or may be communicated via a supervisory channel between the first host system 102A and the second host system 102B.

The link equalization signal may be received at the LLDDs 106 from the host IC 114. The LLDDs 106 and/or the TXs 110 may encode a supervisory signal on the optical data signal that includes the link equalization signal and/or equalization/link status information.

In some embodiments, the host equalization circuits 128 may include a CDR circuit 124 and/or an FFE/DFE 126 circuit. In some embodiments, the host equalization circuits 128 may include other circuits configured to perform other equalization operations.

Additionally or alternatively, in some embodiments, the host-equalized transceivers 104 may include digital diagnostic modules 122. The digital diagnostic modules 122 may be configured to collect data indicative of operating characteristics (e.g., temperature) of one or more of the LTIAs 108, the RXs 112, the TXs 110, and the LLDDs 106. The digital diagnostic modules 122 may be configured to communicate the collected data to the host ICs 114. The host ICs 114 may implement a change to one or more of the LTIAs 108, the RXs 112, the TXs 110, and the LLDDs 106 based on the collected data or may adjust an operating parameter of one or more of the LTIAs 108, the RXs 112, the TXs 110, and the LLDDs 106.

The electrical data signals communicated on driver analog interface 154 may be linear and/or analog. Accordingly, the LLDD 106 can receive the electrical data signal and generate a corresponding driving signal for the TX 110. Similarly, the LTIAs 108 may communicate a linear and/or analog signal along the amplifier analog interfaces 156 to the host IC 114.

In these and other embodiments, the driver analog interfaces 154 and the amplifier analog interfaces 156 may be shorter than the receiver link portion 117 and the transmitter link portion 129 implemented in the embodiment of FIG. 1. For instance, the receiver link portion 117 and the transmitter link portion 129 may include a length of up to about twelve inches. The driver analog interface 154 and the amplifier analog interface 156 may be 66-80% of the length of the receiver link portion 117 and the transmitter link portion 129. For instance, the driver analog interface 154 and the amplifier analog interface 156 may be about six inches.

In the embodiments of FIG. 2, the TX 110 and the RX 112 may include transmitters and receivers with an increased bandwidth relative to the TX 110 and RX 112 implemented in the embodiment of FIG. 1. An increase in the bandwidth may compensate for any degradation in the optical data signals or electrical data signals communicated in the host-equalized optical link 150.

The host-equalized optical link 150 may be implemented in host-equalized optical system 100 in which little overall equalization is necessary. For example, the host-equalized optical system 100 may implement a DFE architecture implementing three or fewer tap coefficients. Accordingly, the host-equalized optical link 150 may be implemented in the host-equalized optical system 100 with little or no changes to equalization capabilities or the first host system 102A or the second host system 102B.

Implementation of the host-equalized optical link 150 may reduce the complexity of the host-equalized optical system 100 and reduce power consumption of the host-equalized optical link 150. For example, the host-equalized optical system 100 may include an optical link that is configured to communicate at a data rate of 25 gigabits per second (G), a data rate of to 28G, or a higher data rate. In these and other embodiments, power consumption of the host-equalized transceivers 104 may decrease by about 500 milliWatts (mW).

In some embodiments, the host-equalized transceiver 104 may include only one of the driver analog interface 154 directly electrically coupled to the LLDD 106 or the amplifier analog interface 156 directly electrically coupled to the LTIA 108. For example, the host-equalized transceiver 104 may include the driver analog interface 154, the LLDD 106, the TX 110 of FIG. 2 and the receiver equalization circuit 125, the receiver link portion 117, the TIA 107, and the RX 112 of FIG. 1. Alternatively, the host-equalized transceiver 104 may include the amplifier analog interface 156, the LTIA 108, the RX 112 of FIG. 2 and the transmitter equalization circuit 123, the LDD 105, and the TX 110 of FIG. 1. Additionally or alternatively, the host-equalized transceivers 104 in the host-equalized optical link 150 may not be identical.

Figure 3:
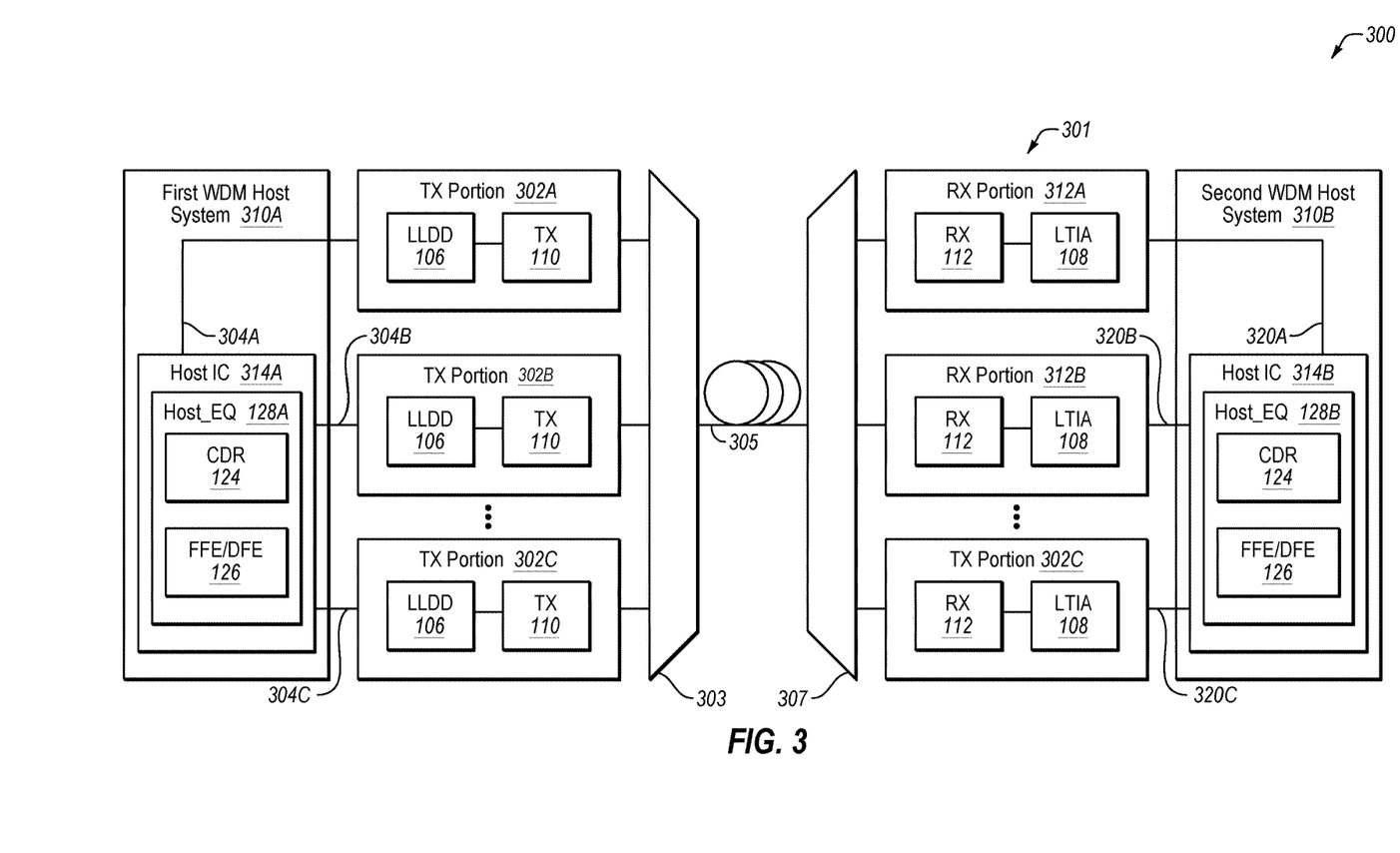
FIG. 3 is a block diagram of an example host-equalized wavelength division multiplex optical communication system.

FIG. 3 is a block diagram of host-equalized wave division multiplex (WDM) optical system 300. The host-equalized WDM optical system 300 is configured to communicate a WDM optical signal between a first WDM host system 310A and a second WDM host system 310B. The first WDM host system 310A and the second WDM host system 310B may include host ICs 314A and 314B (generally, host IC 314 or host ICs 314). The host ICs 314 may include host equalization circuits 128 described with reference to FIG. 2. The host equalization circuits 128 may be configured to equalize the WDM optical signal from the first WDM host system 310A to the second WDM host system 310B. Accordingly, equalization may not be performed by transmitter portions 302A-302C (TX portion 302 or TX portions 302) or receiver portions 312A-312C (RX portion 312 or RX portions 312). For example, the TX portions 302 may not include transmitter equalization circuits (e.g., the transmitter equalization circuits 123 of FIG. 1). Additionally or alternatively, RX portions 312 may not include receiver equalization circuits (e.g., the receiver equalization circuits 125 of FIG. 1).

The TX portions 302 may include components (e.g., LLDD 106 and TX 110) and functionalities similar to those of the host-equalized transceivers 104 described with reference to FIG. 2. For example, the TX portions 302 may include the TX 110 and the LLDD 106. The LLDDs 106 are directly electrically coupled to the host IC 314 via driver analog interfaces 304A-304C (generally, driver analog interface 304 or driver analog interfaces 304).

The RX portions 312 may include components (e.g., LTIA 108 and RX 112) and functionalities similar to those of the host-equalized transceivers 104 described with reference to FIG. 2. For example, the RX portions 312 may include the RX 112 and the LTIA 108. The LTIAs 108 are directly electrically coupled to the host IC 314 via amplifier analog interfaces 320A-320C (generally, amplifier analog interface 320 or amplifier analog interfaces 320).

In the host-equalized WDM optical system 300 of FIG. 3, the first WDM host system 310A may be configured to communicate multiple electrical data signals along the driver analog interfaces 304 to the TX portions 302. The electrical data signals communicated along the driver analog interfaces 304 may be equalized by the host equalization circuit 128 of the host IC 314.

The LLDDs 106 may receive the electrical data signals and generate driving signals that are communicated to the TXs 110. The TXs 110 each generate an optical data signal of a particular wavelength. The optical data signals are multiplexed by a multiplexer 303 onto the WDM optical data signal. The WDM optical data signal is communicated along an optical fiber 305 to a demultiplexer 307. The demultiplexer 307 separates or demultiplexes the WDM optical data signal into multiple optical data signals of the particular wavelengths. Each of the multiple optical data signals may have degraded during communication. Each of the RXs 112 of the RX portions 312 may receive one of the multiple optical data signals. The RXs 112 may generate electrical data signals representative of the received optical data signals. The generated electrical data signals may include degraded characteristics of optical data signals. The RXs 112 may communicate the electrical data signals having the degraded characteristics to the LTIAs 108. The LTIAs 108 may amplify the electrical data signals having the degraded characteristics. The amplified electrical data signals may be communicated to the host IC 314 without equalization being performed via the amplifier analog interfaces 320. The host equalization circuit 128 at the second WDM host system 310B may perform one or more equalization operations on the amplified electrical data signals to reduce or remove the degraded characteristics.

Some or all of the equalization performed by the host equalization circuit 128 may be based on equalization/link status information communicated between the first WDM host system 310A and the second WDM host system 310B. For example, tap coefficient information used in the host equalization circuit 128 may be communicated between the first WDM host system 310A and the second WDM host system 310B. The equalization/link status information may be encoded on the WDM optical data signal and/or may be communicated via a supervisory channel between the first WDM host system 310A and the second WDM host system 310B.

In the host-equalized WDM optical system 300, there are three TX portions 302. In other embodiments, the host-equalized WDM optical system 300 may include fewer than three or greater than three TX portions 302. In addition, in the host-equalized WDM optical system 300, there are three RX portions 312. In other embodiments, host-equalized WDM optical system 300 may include fewer than three or greater than three RX portions 312.

Figure 4:
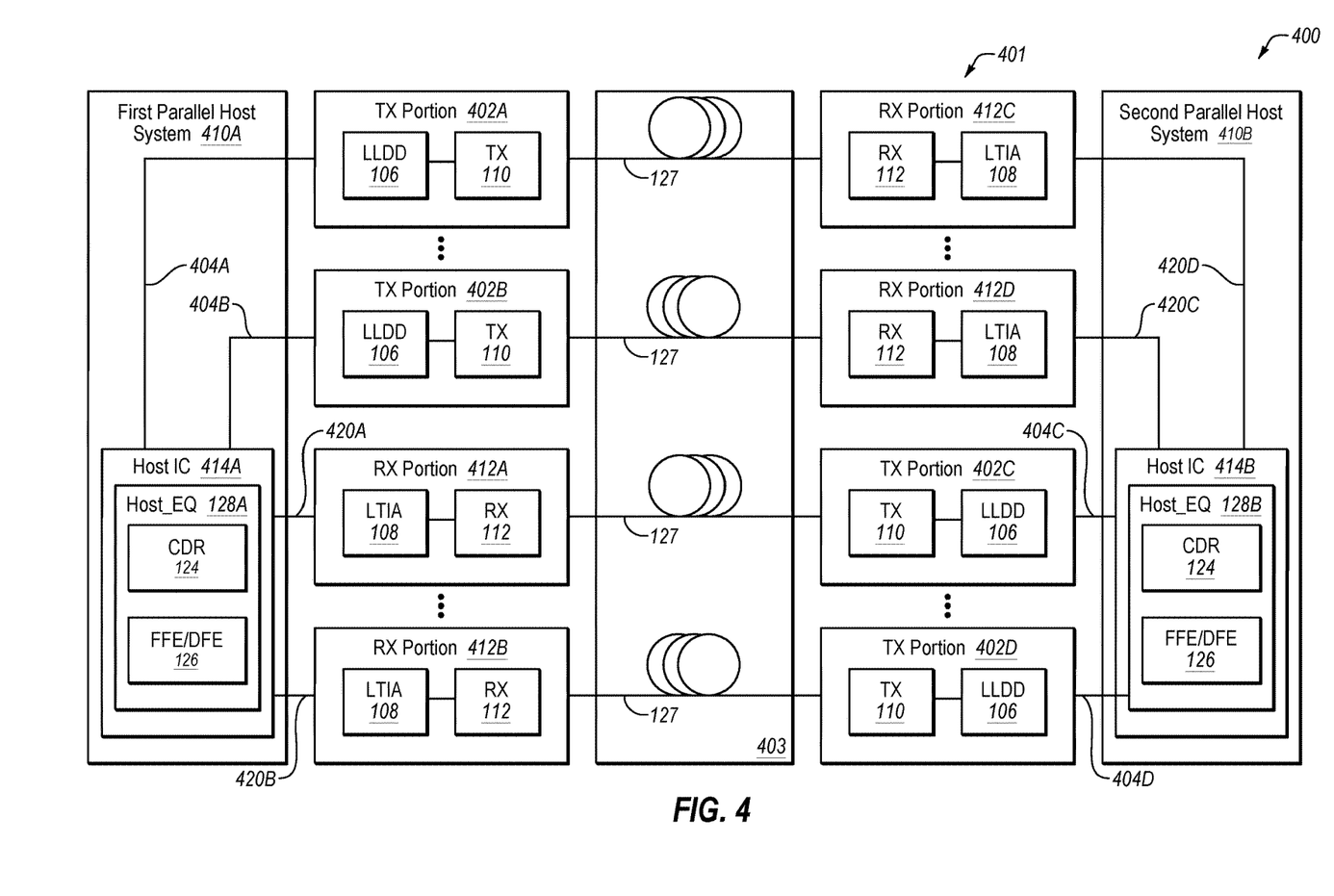
FIG. 4 is a block diagram of an example host-equalized parallel optical communication system, all in accordance with at least one embodiment described herein.

FIG. 4 is a block diagram of host-equalized parallel optical system 400. The host-equalized parallel optical system 400 is configured to communicate a parallel optical signal between a first parallel host system 410A and a second parallel host system 410B. The first parallel host system 410A and the second parallel host system 410B may include host ICs 414A and 414B (generally, host IC 414 or host ICs 414). The host ICs 414 may include host equalization circuits 128 described with reference to FIGS. 2 and 3. The host equalization circuits 128 may be configured to equalize the parallel optical signal from the first parallel host system 410A to the second parallel host system 410B. Accordingly, equalization may not be performed by transmitter portions 402A-402D (TX portion 402 or TX portions 402) or receiver portions 412A-412D (RX portion 412 or RX portions 412). For example, the TX portions 402 may not include transmitter equalization circuits (e.g., the transmitter equalization circuits 123 of FIG. 1). Additionally or alternatively, the RX portions 412 may not include receiver equalization circuits (e.g., the receiver equalization circuits 125 of FIG. 1).

The TX portions 402 may include components (e.g., LLDD 106 and TX 110) and functionalities similar to those of the host-equalized transceivers 104 described with reference to FIG. 2. For example, the TX portions 402 may include the TX 110 and the LLDD 106. The LLDDs 106 are directly electrically coupled to the host IC 414 via driver analog interfaces 404A-404D (generally, driver analog interface 404 or driver analog interfaces 404).

The RX portions 412 may include components (e.g., LTIA 108 and RX 112) and functionalities similar to those of the host-equalized transceivers 104 described with reference to FIG. 2. For example, the RX portions 412 may include the RX 110 and the LTIA 108. The LTIAs 108 are directly electrically coupled to the host IC 414 via amplifier analog interfaces 420A-420D (generally, amplifier analog interface 420 or amplifier analog interfaces 420).

In the depicted embodiment, two TX portions 402 interface with the first parallel host system 410A and two TX portions 402 interface with the second parallel host system 410B. In addition, two RX portions 412 interface with the first parallel host system 410A and two RX portions 412 interface with the second parallel host system 410B. The two TX portions 412 interfaced with the first parallel host system 410A may be configured to generate optical data signals that are communicated to the RX portions 412 interfaced with the second parallel host system 410B. The two TX portions 402 interfaced with the second parallel host system 410B may be configured to generate optical data signals that are communicated to the RX portions 412 interfaced with the first parallel host system 410A.

The parallel host systems 410A and 410B of FIG. 4 may be configured to communicate multiple electrical data signals along the driver analog interfaces 404 to the TX portions 402. The electrical data signals communicated along the driver analog interfaces 404 may be equalized by the host equalization circuit 128 of the host IC 414.

The LLDDs 106 may receive the electrical data signals and generate driving signals. The driving signals are communicated to the TXs 110. The TXs 110 each generate an optical data signal. The optical data signals are communicated along an optical cable 403 that includes multiple optical fibers 127 as parallel optical data signals. The parallel optical data signals are communicated along the optical cable 403. The parallel optical data signals may degrade as they are communicated along the optical cable 403. The RXs 112 of the RX portions 412 may receive one of the parallel optical data signals. The RXs 112 may generate electrical data signals representative of the received optical data signals. The generated electrical data signals may include degraded characteristics of optical data signals. The RXs 112 may communicate the electrical data signals having the degraded characteristics to the LTIAs 108. The LTIAs 108 may amplify the electrical data signals having the degraded characteristics. The amplified electrical data signals may be communicated to the host IC 414 via the amplifier analog interfaces 420. The amplified electrical data signals communicated to the host IC 414 are not equalized prior to communication to the host IC 414. The host equalization circuit 128 may perform one or more equalization operations on the amplified electrical data signals to reduce or remove the degraded characteristics.

Some or all of the equalization performed by the host equalization circuit 128 may be based on equalization/link status information communicated between the first parallel host system 410A and the second parallel host system 410B. For example, tap coefficient information used in the host equalization circuit 128 may be communicated between the first parallel host system 410A and the second parallel host system 410B. The equalization/link status information may be encoded on the parallel optical data signal and/or may be communicated via one or more supervisory channels between the first parallel host system 410A and the second parallel host system 410B.

In the host-equalized parallel optical system 400, there are four TX portions 402. In other embodiments, the host-equalized parallel optical system 400 may include fewer than four or greater than four TX portions 402. In addition, in the host-equalized parallel optical system 400, there are four RX portions 412. In other embodiments, the host-equalized parallel optical system 400 may include fewer than four or greater than four RX portions 412.

The embodiments described herein may include the use of a special purpose or general-purpose computer including various computer hardware or software modules, as discussed in greater detail below.

As indicated above, some embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions may include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A host-equalized optical transceiver comprising:
    a driver analog interface that is configured to directly interface with a transmitter equalization circuit of a host system that is independent of the host-equalized optical transceiver, the driver analog interface having a length that is between six inches and 9.6 inches to limit signal degradation along the driver analog interface following equalization by the transmitter equalization circuit;
    a linear laser diode driver (LLDD) directly electrically coupled to the transmitter equalization circuit via the driver analog interface, the LLDD being configured to receive an equalized electrical data signal directly from the transmitter equalization circuit of the host system via the driver analog interface and to generate a driving signal based on the equalized electrical data signal, wherein the equalized electrical data signal is a linear and analog signal and is equalized by the transmitter equalization circuit of the host system prior to communication to the host-equalized optical transceiver such that the host-equalized optical transceiver performs no additional equalization prior to reception at the LLDD;
    an optical transmitter that is electrically coupled to the LLDD, wherein the optical transmitter is configured to receive the driving signal from the LLDD and to generate an optical signal that is representative of the driving signal;
    an amplifier analog interface;
    an optical receiver that is optically coupled to an optical fiber, wherein the optical receiver is configured to receive optical data signals communicated along the optical fiber and to convert the received optical data signals to electrical data signals representative of the received optical data signals, the electrical data signals including one or more degraded characteristics that develop as the optical data signals propagated along the optical fiber; and
    a linear trans-impedance amplifier (LTIA) that is electrically coupled to the optical receiver and directly electrically coupled to a receiver equalization circuit of the host system via the amplifier analog interface, wherein the LTIA is configured to receive the electrical data signals from the optical receiver and communicate amplified electrical signals directly to the receiver equalization circuit via the amplifier analog interface such that the amplified electrical signals include the degraded characteristics when the amplified electrical signals exit the host-equalized optical transceiver, and the amplifier analog interface includes a length that is between six inches and 9.6 inches to limit introduction of further signal degradation between the LTIA and the receiver equalization circuit,
    wherein the host-equalized optical transceiver does not include additional, module-based equalization circuits such that power associated with generation of the equalized electrical data signal is consumed at the host system and power associated with equalization of the degraded characteristics is consumed at the host system.

2. The host-equalized optical transceiver of claim 1, further comprising a digital diagnostics module configured to monitor operational conditions of one or more or a combination of the LLDD, the LTIA, the optical receiver, and the optical transmitter.

3. The host-equalized optical transceiver of claim 1, wherein:
    the LLDD is further configured to receive a link equalization signal from the host IC, the link equalization signal including data representative of information used in correction and equalization of the optical data signal generated by the optical transmitter and the optical data signal received by the optical receiver; and
    the LLDD is further configured to encode a supervisory signal onto the optical data signal that is representative of the link equalization signal.

4. The host-equalized optical transceiver of claim 3, wherein:
    the optical transmitter includes a vertical cavity surface emitting laser; and
    the optical transmitter is configured to communicate at a data rate of about 25 gigabits per second.

5. A host-equalized wave division multiplex (WDM) optical system comprising:
    a multiplexer; and
    a plurality of transmitter portions optically coupled to the multiplexer,
    wherein:
        each of the plurality of transmitter portions includes the host-equalized optical transceiver of claim 1, configured to generate one optical data signal of a plurality of optical data signals;
        each of the plurality of optical data signals includes a particular wavelength; and
        the multiplexer is configured to multiplex the plurality of optical data signals into a WDM optical signal.

6. A host-equalized parallel optical system comprising a plurality of transmitter portions, wherein each of the plurality of transmitter portions includes the host-equalized optical transceiver of claim 1.

7. A host-equalized optical link configured to be implemented between a first host system and a second host system, the host-equalized optical link comprising:
    a first host-equalized optical transceiver including:
        a driver analog interface that is configured to interface with a transmitter equalization circuit of the first host system, the driver analog interface having a length that is between six inches and 9.6 inches to limit signal degradation along the driver analog interface following equalization by the transmitter equalization circuit;

a linear laser diode driver (LLDD) directly electrically coupled to the transmitter equalization circuit via the driver analog interface, the LLDD being configured to receive an equalized electrical data signal directly from the transmitter equalization circuit of the first host system the via the driver analog interface and to generate a driving signal based on the equalized electrical data signal, wherein the equalized electrical data signal is a linear and analog signal and is equalized by the transmitter equalization circuit of the first host system prior to communication to the first host-equalized optical transceiver such that the first host-equalized optical transceiver performs no additional equalization prior to reception at the LLDD; and an optical transmitter that is electrically coupled to the LLDD, the optical transmitter configured to receive the driving signal from the LLDD and to generate an optical data signal that is representative of the driving signal;

an optical fiber; and a second host-equalized optical transceiver including:
an amplifier analog interface;
an optical receiver communicatively coupled to the optical transmitter of the first host-equalized optical transceiver via the optical fiber, the optical receiver configured to receive optical data signals communicated along the optical fiber and to convert the received optical data signals to electrical data signals representative of the received optical data signals, the electrical data signals including one or more degraded characteristics that develop as the optical data signals propagated along the optical fiber; and a linear trans-impedance amplifier (LTIA) that is electrically coupled to the optical receiver and directly electrically coupled to a receiver equalization circuit of the second host system via the amplifier analog interface, the LTIA being configured to receive the electrical data signals from the optical receiver and communicate amplified electrical signals directly to the receiver equalization circuit via the amplifier analog interface such that the amplified electrical signals includes the degraded characteristics when the amplified electrical signals exit the second host-equalized optical transceiver, and the amplifier analog interface includes a length that is between six inches and 9.6 inches to limit introduction of further signal degradation between the LTIA and the receiver equalization circuit, wherein:
the first host-equalized optical transceiver and the second host-equalized optical transceiver do not include additional, module-based equalization circuits such that power associated with generation of the equalized electrical data signal is consumed at the first host system and power associated with equalization of the degraded characteristics is consumed at the second host system; and the optical signal communicated between the first host-equalized optical transceiver and the second host-equalized optical transceiver is maintained as a linear signal from the driver analog interface to the amplifier analog interface.

8. The host-equalized optical link of claim 7, wherein the first host-equalized optical transceiver includes a digital diagnostics module configured to monitor operational conditions of one or more or a combination of the LLDD and the optical transmitter.

9. The host-equalized optical link of claim 7, wherein:
the LLDD is further configured to receive a link equalization signal from the first host IC, the link equalization signal including data representative of information used in correction and equalization of the optical data signal generated by the optical transmitter and the optical data signal received by the optical receiver; and
the LLDD is further configured encode a supervisory signal onto the optical data signal that is representative of the link equalization signal.

10. The host-equalized optical link of claim 7, wherein the second host-equalized optical transceiver includes:
a second driver analog interface that is configured to interface with the second host IC of the second host system;
a second LLDD directly electrically coupled to the second via the second driver analog interface, the second LLDD configured to receive an equalized electrical data signal directly from the second via the second driver analog interface and to generate a driving signal based on the equalized electrical data signal, the equalized electrical data signal being a linear signal; and
a second optical transmitter that is electrically coupled to the second LLDD, the second optical transmitter configured to receive the driving signal from the LLDD to generate an optical data signal that is representative of the driving signal.

11. The host-equalized optical link of claim 10, wherein the first host-equalized optical transceiver includes:
a second amplifier analog interface;
a second optical receiver coupled to the second optical transmitter of the second host-equalized optical transceiver via the optical fiber, the optical receiver configured to receive optical data signals communicated along the optical fiber and to convert the received optical data signals to electrical data signals representative of the received optical signals, the electrical data signals including one or more degraded characteristics; and
a second LTIA that is electrically coupled to the second optical receiver and directly electrically coupled to the first host IC of the first host system via the second amplifier analog interface, the LTIA being configured to receive the electrical data signals from the optical receiver and communicate amplified electrical signals directly to the via the amplifier analog interface, the amplified electrical signals including the degraded characteristics.

12. An active optical cable comprising the host-equalized optical link of claim 7.

13. An optical system comprising:
a first host system that includes a first host integrated circuit (ICI;
a second host system that includes a second host IC;
a host-equalized optical link comprising:
a first host-equalized optical transceiver including:
a driver analog interface that is configured to interface with a transmitter equalization circuit of the first host system, the driver analog interface having a length that is between six inches and 9.6 inches to limit signal degradation along the driver analog interface following equalization by the transmitter equalization circuit;

a linear laser diode driver (LLDD) directly electrically coupled to transmitter equalization circuit the via the driver analog interface, the LLDD being configured to receive an equalized electrical data signal directly from the transmitter equalization circuit of the first host system the via the driver analog interface and to generate a driving signal based on the equalized electrical data signal, wherein the equalized electrical data signal is a linear and analog signal and is equalized by the transmitter equalization circuit of the first host system prior to communication to the first host-equalized optical transceiver such that the first host-equalized optical transceiver performs no additional equalization prior to reception at the LLDD; and an optical transmitter that is electrically coupled to the LLDD, the optical transmitter configured to receive the driving signal from the LLDD and to generate an optical data signal that is representative of the driving signal;

an optical fiber;

a second host-equalized optical transceiver including:
an amplifier analog interface;
an optical receiver communicatively coupled to the optical transmitter of the first host-equalized optical transceiver via the optical fiber, the optical receiver configured to receive optical data signals communicated along the optical fiber and to convert the received optical data signals to electrical data signals representative of the received optical data signals, the electrical data signals including one or more degraded characteristics that develop as the optical data signals propagated along the optical fiber; and a linear trans-impedance amplifier (LTIA) that is electrically coupled to the optical receiver and directly electrically coupled to a receiver equalization circuit of the second host system via the amplifier analog interface, the LTIA being configured to receive the electrical data signals from the optical receiver and communicate amplified electrical signals directly to the receiver equalization circuit via the amplifier analog interface such that the amplified electrical signals includes the degraded characteristic when the amplified electrical signals exit the second host-equalized optical transceiver, and the amplifier analog interface includes a length that is between six inches and 9.6 inches to limit introduction of further signal degradation between the LTIA and the receiver equalization circuit, wherein:

the optical signal communicated between the first host-equalized optical transceiver and the second host-equalized optical transceiver is maintained as a linear signal from the driver analog interface to the amplifier analog interface; and the first host-equalized optical transceiver and the second host-equalized optical transceiver do not include additional, module-based equalization circuits such that power associated with generation of the equalized electrical data signal is consumed at the first host IC and power associated with equalization of the degraded characteristics is consumed at the second host IC.

14. The optical system of claim 13, wherein the first host IC is configured to communicate a link equalization signal with the second via the host-equalized optical link.

* * * * *